May 22, 1934.
A. GORDON
WASTE TRAP
Filed June 3, 1932
1,959,623
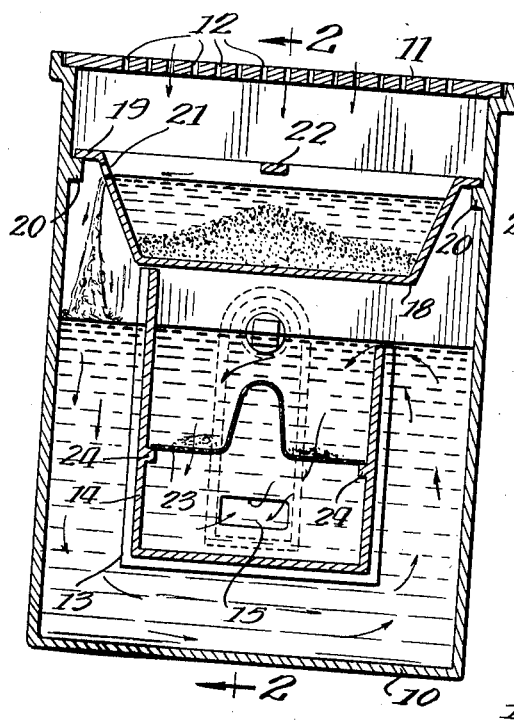
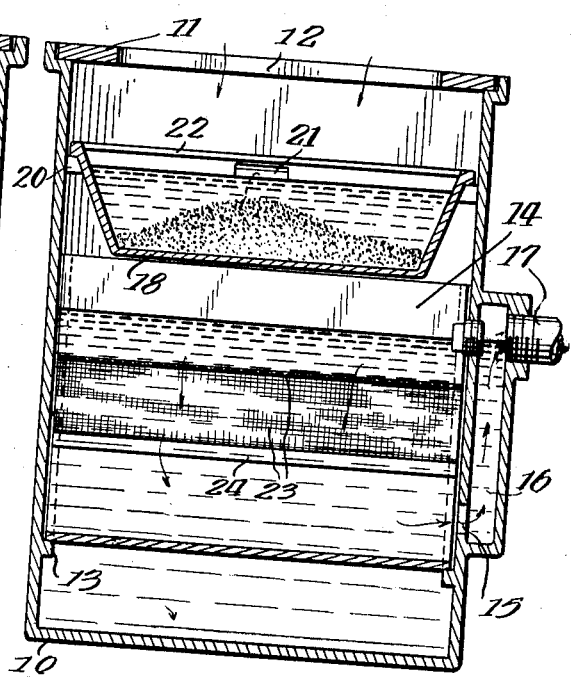
Inventor:
Arthur Gordon
By Maurice S. Cayne
Atty Patented May 22, 1934

1,959,623

UNITED STATES PATENT OFFICE 1,959,623

WASTE TRAP

Arthur Gordon, Chicago, Ill., assignor to George H. Dubin, Chicago, Ill.

Application June 3, 1932, Serial No. 615,204

3 Claims. (Cl. 210—56)

This invention relates to a novel and improved trap especially adapted for treating waste water from garages and the like for the removal of oil, grease and sediment from those waters.

The main object of the invention is to provide a trap of the character described, having associated therewith a removable catch basin, within which the heavier sediment is adapted to be deposited, and also a novel construction of separator for causing the ready separation of grease and oils present in the waste water, whereby the waste water escaping from said trap will be free of the above sediment and impurities.

Another object of this invention is to provide a trap of the character described, especially adapted for use in garages and the like, having a basin within which is removably mounted a separator, around which the waste water is made to flow, and a catch basin disposed above said separator adapted for receiving therein the heavier sediment present in the waste water entering said trap.

A still further object of this invention is to provide a trap of the character described, particularly adapted for use in garages and the like, said trap comprising a basin having a grating at its upper end, through which the waste water may enter said trap, a pan disposed below said grating and in position to receive the waste water entering through said grating, said pan being adapted for permitting the depositing therein of the heavier sediment present in said waste water, a water outlet adjacent the upper end of said pan, and a separator disposed below said pan and in position for separating the grease and oils from said waste water, and a screen disposed between the walls of said separator through which the waste water must pass before entering the outlet from said trap.

A still further object of this invention is to provide a trap of the character described, particularly adapted for use in garages and the like, said trap permitting the entrance of waste water through the upper end thereof and having removably mounted therein a catch basin for receiving the heavier sediment, a separator disposed below said catch basin, and a screen interposed between the inlet to said separator and the outlet from said trap, said screen and separator being removable from said trap.

A still further object of this invention is to provide a trap of the character described, adapted for separating lighter liquids, such as oil or the like, from heavier liquids, such as waste water or the like, said trap comprising an inlet and an outlet and a removable separator disposed between said inlet and outlet, said separator being of substantially rectangular formation and open at its upper end only.

A still further object of this invention is to provide an apparatus of the character described, which will be composed of few and simple parts, constructed along lines convenient for low cost production, which may be readily assembled and disassembled, and which will be highly efficient for carrying out the purposes for which it is designed.

With the foregoing and other objects in view, which will appear as the description proceeds, the invention consists in the arrangement and combination of parts hereinafter more fully described, illustrated in the accompanying drawing and particularly pointed out in the appended claims, it being understood that various changes in the form, proportion, size and minor details of the structure may be made without departing from the spirit or sacrificing any of the advantages of the invention.

For the purpose of facilitating an understanding of my invention I have illustrated in the accompanying drawing a preferred embodiment thereof, from an inspection of which when considered in connection with the following description, my invention, its mode of construction and many of its advantages should be readily understood and appreciated.

Referring to the drawing, in which similar characters of reference are employed to indicate corresponding parts throughout the several figures of the drawing:—

Figure 1 is a vertical sectional view through a waste water trap constructed in accordance with the principles of my invention; and Figure 2 is a similar view taken on line 2—2 of Figure 1.

Referring to the drawing more specifically by characters of reference, the numeral 10 designates the basin proper of my improved trap, which basin may be formed of any suitable material, and which may be of any desired cross sectional shape, such for example as circular or rectangular. The upper edge of the basin 10 is open and is adapted to be closed by a suitable cover 11, which may be in the form of a grating of a size and strength to permit the use of the same in garages and the like. As shown in the drawing, the cover 11 is provided with the vertical slots 12 and is disposed in place in the upper end of the basin 10 in such a manner as to be readily removed therefrom for the purpose of gaining access to the inside of the basin.

On two of the oppositely disposed inner walls of the basin 10 is provided an inwardly extending U shaped flange 13, upon which is adapted to be disposed my improved separator 14, which separator is of substantially U shaped formation in cross section as shown in Figure 1 of the drawing, said separator having one wall thereof a less height than the opposed wall thereof. When in assembled position the separator will rest within the flanges 13 and will extend across the full width of the basin as shown in Figure 2. When in that position it will be noted that the open ends of the separator will be closed by the side walls of the basin so that all the waste water entering said basin must traverse around the under side of the separator and over the same to reach the outlet 15 provided in one side wall of the basin 10. The outlet 15 communicates with a chamber 16 at the upper end of which is provided the outlet 17.

Disposed above the separator 14 is a catch basin 18, said basin being in the form of a pan provided with outwardly extending flanges 19 at its upper end, which flanges are adapted to rest on flanges 20 provided on the inner surfaces of the side walls on the basin 10. The pan 18 is closed at its bottom edge and is provided with an outlet 21 adjacent the upper edge thereof. A suitable handle 22 extends across the full width of the upper edge of said pan 18, said handle being provided for facilitating in lifting the pan out of the basin 10. Intermediate the top and bottom of the separator 14 is disposed a suitable screen, which may be of bee-hive construction for catching any sediment that may still remain in the waste water entering the separator. The screen 23 is disposed so as to rest on a pair of inwardly extending flanges 24 provided on the inner surfaces of the side walls of the separator.

From the construction so far described it should be apparent that any waste water entering the trap will first enter the pan 18 within which will be deposited all the heavier sediments such as sand or the like, the water from said pan escaping through the outlet 21 and flowing into the basin 10. The flow of the water in the basin will be around the separator and then past the screen 23 and out through the outlets 15 and 17. By reason of this construction all of the heavier sediment will be deposited within the pan 18, whereas the oils and grease present in the waste water will flow to the top of the level within the basin 10, with the result that the waste water entering the outlet 15 will be practically clear of any sediment or oils and greases.

An important feature of this construction resides in the fact that the grating 11 may be readily removed for gaining access to the inside of the basin. The pan 18 may also be readily removed for cleaning the same and after the removal of the pan 18 the separator 14, together with the screen 23 may also be readily removed for cleaning out the same. It will thus be noted that I have provided a trap which is so constructed as to make it possible to readily enter the same for cleaning out the same from time to time.

It is believed that my invention, its mode of construction and assembly and many of its advantages should be readily understood from the foregoing, without further description, and should also be manifest that while a preferred embodiment of the invention has been shown and described for illustrative purposes, the structural details are, nevertheless, capable of wide variation within the purview of my invention as defined in the appended claims.

What I desire to secure by Letters Patent of the United States is:—

1. An apparatus of the character described comprising a basin provided with an inlet and outlet, the inlet to said basin being provided at the upper end thereof, a removable catch pan disposed below said inlet and in position to catch all matter entering said basin, an outlet from said catch pan provided adjacent the upper end thereof, a substantially U-shaped separator disposed within said basin below said catch pan and between the outlet from said pan and the outlet from said basin, whereby all liquid entering said basin must traverse the entire outer surface of said separator before being permitted to escape from said outlet, said separator being removable from said basin.

2. An apparatus of the character described comprising a basin, the upper end of which is closed by a grating, a catch pan disposed below said grating and removably held in place for receiving all matter entering said basin through said grating, a liquid outlet provided for said pan adjacent the upper end thereof, a substantially U-shaped separator provided in said basin and disposed below said pan, an outlet for said basin provided adjacent the lower edge of said separator on the inner side thereof, whereby all liquid entering said basin must traverse around the outer surface of said separator before being permitted to escape through said basin outlet, and a screen interposed between the inlet to said separator and the outlet from said basin.

3. An apparatus of the character described comprising a basin having an inlet and an outlet, a catch pan and a substantially U-shaped separator disposed within said basin between said inlet and outlet, whereby all matter entering said basin must first pass through said catch pan and then traverse the outer surface of said separator before being permitted to enter the outlet from said basin, said catch pan and separator being removable from said basin through the inlet thereof, and a screen member interposed intermediate the top and bottom of said separator.

ARTHUR GORDON.